(12) United States Patent
Gharda

(10) Patent No.: US 9,199,878 B2
(45) Date of Patent: Dec. 1, 2015

(54) PROCESS FOR MANUFACTURING PHOSPHOROUS TRICHLORIDE, PHOSPHOROUS PENTACHLORIDE AND CEMENT

(76) Inventor: Keki H. Gharda, Maharashtra (IN)

(*) Notice: Subject to any disclaimer, the term of this patent is extended or adjusted under 35 U.S.C. 154(b) by 981 days.

(21) Appl. No.: 13/139,254

(22) PCT Filed: Dec. 11, 2009

(86) PCT No.: PCT/IN2009/000719
§ 371 (c)(1),
(2), (4) Date: Jun. 10, 2011

(87) PCT Pub. No.: WO2010/084509
PCT Pub. Date: Jul. 29, 2010

(65) Prior Publication Data
US 2011/0256040 A1    Oct. 20, 2011

(30) Foreign Application Priority Data
Dec. 11, 2008  (IN) .................... 2588/MUM/2008

(51) Int. Cl.
*C01B 25/10* (2006.01)
*C04B 7/60* (2006.01)
*C01B 25/01* (2006.01)

(52) U.S. Cl.
CPC . *C04B 7/60* (2013.01); *C01B 25/10* (2013.01); *C01B 25/01* (2013.01); *C04B 2290/20* (2013.01)

(58) Field of Classification Search
None
See application file for complete search history.

(56) References Cited

U.S. PATENT DOCUMENTS

| | | | |
|---|---|---|---|
| 1,606,319 A * | 11/1926 | Parsons et al. | 423/304 |
| 1,730,521 A | 10/1929 | Miner | |
| 1,926,072 A | 9/1933 | Vivian | |
| 2,622,965 A * | 12/1952 | Tidwell | 423/300 |
| 2,753,253 A * | 7/1956 | Hollingsworth | 71/44 |
| 2,773,736 A | 12/1956 | Hollingsworth | |
| 3,235,330 A | 2/1966 | Lapple | |
| 3,241,917 A | 3/1966 | Lapple | |
| 3,247,014 A | 4/1966 | Goldberger et al. | |
| 3,383,181 A | 5/1968 | Woyski et al. | |
| 3,723,608 A | 3/1973 | Meurer et al. | |
| 3,923,961 A | 12/1975 | Dancy | |
| 4,351,813 A | 9/1982 | Megy et al. | |
| 4,389,384 A | 6/1983 | Hard | |

OTHER PUBLICATIONS

International Search Report for PCT/IN2009/000719 dated Aug. 26, 2010.
Kirk-Othmer ED—Mark H F et al.; "Encyclopedia of Chemical Technology, Cement"; Jan. 1, 1989; Kirk-Othmer Encyclopedia of Chemical Technology. Castor Oil to Chlorosulfuric Acid, New York, Wiley & Sons, US; pp. 163-171; XP002445557.

* cited by examiner

*Primary Examiner* — Wayne Langel
(74) *Attorney, Agent, or Firm* — Kenealy Vaidya LLP

(57) ABSTRACT

A process for manufacturing phosphorous trichloride, phosphorous pentachloride and cement comprising of heating at elevated temperature of 1100° C. to 1500° C. pulverized mixture of phosphate ores, carbonaceous substances, silica and/or alumina and treating the resultant gaseous products with chlorine in the ratio of 1 to 5 moles of chlorine per mole of phosphorous oxide contained in the phosphate ores while maintaining the temperature between 400° C. to 1000° C. by cooling and thereafter firstly separating gaseous mixture of primarily phosphorous trichloride and phosphorous pentachloride, from cement and later separating phosphorous trichloride and phosphorous pentachloride, both separations by known methods.

7 Claims, No Drawings

PROCESS FOR MANUFACTURING PHOSPHOROUS TRICHLORIDE, PHOSPHOROUS PENTACHLORIDE AND CEMENT

This application is a U.S. national phase filing under 35 U.S.C. §371 of PCT Application No. PCT/IN2009/000719, filed Dec. 11, 2009, and claims priority under 35 U.S.C. §119 to Indian Patent Application No. 2588/MUM/2008, filed Dec. 11, 2008, the entireties of both which are incorporated by reference herein.

INTRODUCTION

This invention relates to a novel process for manufacturing phosphorous trichloride, phosphorous Pentachloride and useful cements such as Portland cement by processing Phosphate ores of varying quality in entirety in a way to convert the Phosphorus content to commercially significant phosphorous Trichloride and phosphorous pentachloride directly without reduction to its elemental form in addition to useful cement.

Phosphorus is an important element with wide industrial application in Fertilizers, Agro Chemicals, Animal feed, Plastics and general Chemicals affecting the wellbeing of mankind in many ways and hence any improvement in the manufacturing process is certain to benefit humanity in a big way.

The present invention not only makes the manufacturing of Phosphorus chlorides simple, straight forward and economical but also converts the otherwise waste products into equally important useful cement for construction, thereby giving multiple benefits.

PRIOR ART

U.S. Pat. No. 1,730,521 talks about production of Phosphorus chlorides from Phosphate ores by mixing the ore with SiO2 and heating to high temperature along with Chlorine, converting the Calcium and SiO2 contents to the silicate of Calcium using coke as the source of thermal energy.

U.S. Pat. No. 3,241,917 of 1962 teaches a process for producing P2O5 by treating the Phosphate ores with coke Reactor.

U.S. Pat. No. 3,247,014 describes a Fluidised Bed Reactor with CO plasma heating, again producing the slag of similar silicates of Calcium.

U.S. Pat. No. 3,723,608 describes a process for production of Phosphorus from Phosphate ores, silica and C, using electrical heat.

U.S. Pat. No. 3,923,961 describes a process for producing Phosphorus and Tricalcium orthophosphate in a Rotary Kiln with or without addition of silica.

U.S. Pat. No. 4,389,384 describes a Process for reducing phosphate ore with Carbonaceous matter and silica and oxidizing further to P2O5

U.S. Pat. No. 4,351,813 teaches a process for producing P2O5 or Phosphorus or Phosphoric acid from Phosphate ores.

U.S. Pat. No. 3,235,330 deals with recovery of Phosphorus values and Cement Clinker from Phosphate ores by reduction of Calcium Phosphate and in situ oxidation of Phosphorus generated with addition of various amounts of Al2O3 and SiO2 to form the Cement Clinker in residue.

None of these found favour with the Phosphorus-Phosphorus derivatives industry as commercially viable processes. The Phosphorus industry has chosen arc Furnace process as the commercially important process for production of Phosphorus and subsequently its derivatives like PCl3, PCl5, P2O5, P2S5 and Phosphoric acid from the Phosphorus thus produced, losing the Calcium value as Calcium silicate and consuming valuable electrical power. The said process can be described in brief as follows:

The phosphate rock is ground, usually in a ball mill, and pelletised utilising clay as a binder to form briquettes or pellets with a typical diameter of 1 cm. Any fine or broken pellets generated in the downstream process are also recovered and recycled at this point. For strengthening, these are baked to form solid briquettes in a kiln which is usually fired with the carbon monoxide generated as a by-product from a downstream process stage. This step is conducted at sufficiently high temperature to ensure that the fluoride contained in the pellets is driven off and scrubbed from the kiln exhaust gases. The pellets are then cooled and transported to large silos located over the phosphorus furnace. From here they are gravity fed continuously into the furnace along with the correctly balanced stream of carbon (normally coke) and silica.

The phosphorus furnace itself is a carbon-lined electric arc reduction design, usually having a number of carbon electrodes suspended through the furnace cover and maintained above the base of the furnace. The power consumption is influenced by the conductivity of the physical load and the operating temperature can be controlled by raising or lowering the suspended electrodes in order to maintain power consumption at a desired level. The temperature will normally be maintained at 1200° C.-1500° C.

The large amount (to the tune of 7-8 MT per Tonne of Phosphorus produced) of calcium silicate ($CaSiO_3$) generated as a byproduct is in a molten phase and collects at the base of the furnace where it is periodically tapped and diverted to external pits where it cools to a hard mass which may be broken up for sale or disposal into the construction industry as a slag.

The Phosphorus thus produced has to be converted to PCl3 or other compounds again expending energy in separate plant.

INVENTION

According to this invention the Phosphate ores can be processed in an integrated and eco-friendly way, economically, to produce Phosphorus chlorides in a flexible manner using an assembly of easily constructed standard equipment without using colossal amounts of scarce electrical power and without having to reduce the Phosphates to elemental Phosphorus.

This invention proposes a process for manufacturing phosphorous trichloride, phosphorous pentachloride and useful cement comprising of heating at elevated temperature of 1100° C. to 1500° C., pulverised mixture of phosphate ores, carbonaceous substances, silica and/or alumina and treating the resultant gaseous products with chlorine in the ratio of 1 to 5 moles of chlorine per mole of phosphorous oxide contained in the phosphate ores while maintaining the temperature between 400° C. to 1000° C. by cooling and thereafter firstly separating gaseous mixture of phosphorous trichloride and phosphorous pentachloride (formed whilst cooling the PCl3 containing gases if excess Cl2 is present), from useful cement and later separating phosphorous trichloride and phosphorous pentachloride, both separations by known methods. The aforesaid carbonaceous substances preferably would be any one or more of coke, semicoke, asphalt, wood charcoal, char or biomass. In the aforesaid process the phosphate ores would preferably contain 2 to 45% of phosphorous oxide and to the mixture of phosphate ores, carbonaceous substances, silica and/or alumina would be preferably added iron oxide.

Surprisingly this invented process is found to be quite flexible in that apart from phosphorous chlorides, Phosphorus Derivatives such as P2O5, P2S5 and Phosphoric acids can be produced at will in any proportion by controlling the input Chlorine or its compounds and heating/cooling operation, in which Phosphate ores are heated with adequate amounts of SiO2, Al2O3, Fe2O3 etc. in the form of clay, Bauxite, sand etc. at elevated temperature as also with Cl2-S compounds by processing Phosphate ores of varying quality in different ways to convert the elements to desired combination of products by varying conditions and equipment design.

It is also found that the invented process can be carried out using the energy from minimum quantity of Carbonaceous matter like low grade coke or semicoke as the source of thermal energy for the decomposition alone and without wasting as reductant, avoiding use of direct electrical energy for the production of Phosphorus and Phosphorus Derivatives along with cements, directly by processing Phosphate ores of varying quality.

It is also found that compared to the processes known in the prior art, less quantity of silica and/or alumina are required to be mixed with phosphate ores (e.g. 30% only) to obtain useful cement.

In the invented process exothermic and endothermic Reactions are balanced to a great extent, using thermal energy efficiently by using low grade coke instead of use of large quantity of electrical energy for the production of Phosphorus and Phosphorus Derivatives directly by processing Phosphate ores of varying quality.

In the invented process, commercially significant useful cement is produced along with Phosphorus Chlorides and Phosphorus Derivatives by processing Phosphate ores of varying quality in its entirety in a way to convert the elements other than Phosphorus to cement clinker, thereby practically eliminating large quantity of wastes.

DESCRIPTION OF THE INVENTION

Calcium Phosphate or any source of it such as Phosphate ores containing anywhere between 2 to 45%, preferably 25-40% of Phosphorus as P2O5 as is conventionally reported is pulverized to a fine size, between 20 to 150 mesh, preferably 60-100 mesh and mixed with required amount of compounds such as SiO2, Fe2O3, Al2O3 or any one or more of them in pure form or preferably in the mineral forms of clay, Bauxite, fly ash, sand etc. for economic reason, all preferably pulverized to fine particle size, mixed well and first heated as such or after granulating or pelletizing or agglomerating in any manner known in the art, at a temperature between 1100 and 1300° C., preferably between 1200 and 1400° C. The heating may be effected by an electric arc, electrical resistance heating, preferably by burning any carbonaceous material, using a gas containing O2 as pure O2 or air or enriched air, preferably nearly pure O2.

Water or moisture during the Reaction, being detrimental to the production of many of the valuable products, is kept to the minimum by carrying out drying and or calcination of all the input materials as known in the art.

As one alternative of the invented process, the Phosphorus value generated from this first Reaction along with other products in the gaseous state are condensed partly or fully to separate them from the others, also tapping the cement from the solid part after ensuring adequate removal of Phosphorus content and formation of appropriate mineral phases in the cement.

In another alternative, the products from the first stage containing Phosphorus and its oxides are further reacted fully or partly, with carbonaceous material, preferably CO, and Chlorine containing reactants such as Cl2 itself, COCl2, any of the sulphur chlorides, or mixtures of compounds of Sulphur and Chlorine, to produce any or all of the chlorides of Phosphorus and/or Sulphur which are condensed and/or scrubbed in suitable solvents such as Mono Chloro Benzene, Di Chloro Benzene etc. By the appropriate selection of the reactants, valuable chemicals such as Phosphorus, PCl3, P2O5, P2S5 and Phosphoric acids etc. all of which can be separated using methods known in the art.

Any undesirable element or compound such as CaF2 can be reduced to acceptable level by appropriate treatment known in the art, for example by heating with moisture to release as HF.

As per this invention, while the elements other than Phosphorus present in the Phosphate ores are converted into useful cements by reacting the pulverized ore with fine or pulverized quantities of any form of SiO2, Al2O3, Fe2O3, or any of them preferably between 1200 and 1500° C. in suitable type of Fluidised Bed Reactor, fixed bed Reactor, shaft kiln or Rotary Kiln known in the Chemical Engineering art, the Phosphorus values are directly released and subsequently converted to Phosphorus derivatives.

The major chemical Reactions that take place include (while not exhaustive):

1. $P_2O_5 + 5CO + 3Cl_2 \rightarrow 2PCl_3 + 5CO_2$
2. $CO_2 + 3C + O_2 \rightarrow 4CO$.
3. $P + 3/2Cl_2 \rightarrow PCl_3$
4. $PCl_3 + Cl_2 \rightarrow PCl_5$.
5. $Ca_3(PO_4)_2 + xSiO_2 + yAl_2O_3 + zFe_2O_3 \rightarrow 3CaO.xSiO_2.yAl_2O_3.zFe_2O_3 + P_2O_5$ This is indeed an overly simplified version of the formation of cement. The actual mineral phases are more complex and are very well described in the art and science of cement manufacturing. Needless to say, additional minerals can be incorporated to attain special properties of cement by a simple extension of the same process.

6. $Ca_3(PO_4)_2 + 5C \rightarrow 3CaO + 5CO + 2P$.
7. $C + O_2 \rightarrow CO_2$.
8. $2CO + O_2 \rightarrow 2CO_2$
9. $CO + Cl_2 \rightarrow COCl_2$.

EXAMPLES

Example 1

The raw material mix contained 100 parts rock phosphate, 10 parts silica sand, 6 parts clay and 28.6 parts of coke (Mole ratio CaO:SiO2=3:1). The phosphate ore analysed 33.68 percent P2O5, 45.90 percent CaO, 4.9 percent SiO2, 0.56 percent Al2O3 and 3.43 percent Fe2O3 all by weight; ground in ball mill (passing through 200 mesh). The coke used had low volatiles and was ground to −200 mesh size. The river silica sand of 82 percent SiO2 content was also ground to −200 mesh size and blended with rock phosphate carbon mixture. The blended mixture was aggregated in a vibrating granulator. The aggregate of 50 gms after Calcination at 800° C. for 2 hours was placed inside the alumina tube reactor of size 48 mm OD, 40 mm ID and 375 mm length. The alumina reactor is heated initially with electrical heating up to 1050° C. and then temperature raised & maintained at 1300-1400° C. by burning in oxygen for 4 hrs in presence of bedding coke. The gaseous product containing P2O5 was passed through a Fluidised Bed of powdered semi coke along with Cl2 slightly in stoichiometric excess for conversion to PCl3 (Reactor kept cooled to maintain temperature around 600-700° C.) and the products from this Reactor were collected in an externally cooled glass collection pot. The liquid product showed primarily PCl3 with some PCl5 as a secondary product from excess Cl2.

The clinker residue collected at the end of reaction contained 2.4% P2O5 (corresponding to 94.2% removal).

Example 2

The initial feed mixture was prepared by mixing the materials of the above origin to an aggregate of CaO:SiO2 mole ratio 2:1. The feed aggregate added with 21.5 parts of semi coke, which corresponds to P2O5 to carbon mole ratio 1:10. The reaction bed is heated initially with electrical heating up to 1000° C. and then thermally by passing O2 to the bed containing feed aggregate to 1250° C. The product gases are then mixed with chlorine in the out let in a gas phase Reactor. The final product is a fuming liquid and collected in a cooled glass lined pot. The liquid product analysed for phosphorous and chlorine content and found to be PCl3 with fine droplets of some phosphorous.

The clinker residue is analysed for residual P2O5 and confirms greater than 90% removal of P2O5. The residue also contains 5% unreacted carbon which does not allow the aggregate to melt and favors maximum P2O5 removal.

Example 3

The raw material mix contained 100 parts rock phosphate, 51 parts silica sand (Mole ratio CaO:SiO2=1:1) and 40 parts of coke. The phosphate ore analysed 33.68 percent P2O5, 45.90 percent CaO, 4.9 percent SiO2, 0.56 percent Al2O3 and 3.43 percent Fe2O3 all by weight; ground in ball mill (passing through 200 mesh). The coke used had low volatiles and was ground to −200 mesh size. The river silica sand was also ground to −200 mesh size and blended with rock phosphate carbon mixture. The blended mixture was aggregated in a vibrating granulator. The aggregate of 50 gms after Calcination at 800° C. for 2 hours was placed inside the alumina tube reactor of size 48 mm OD, 40 mm ID and 375 mm length. The alumina reactor is heated initially with electrical heating up to 1050° C. and then temperature raised & maintained at 1300-1400° C. by burning in oxygen for 4 hrs in presence of bedding coke. The gaseous product containing P2O5 was passed through a Fluidised Bed of powdered semi coke along with Cl2 slightly in stoichiometric excess for conversion to PCl3 and the products from this Reactor were collected in an externally cooled glass collection pot. The liquid product showed primarily PCl3 with some PCl5.

The clinker residue collected at the end of reaction contained 2.4% P2O5 (corresponding to 94.2% removal) in the cementatious Calcium silicate.

Example 4

The feed mixture prepared by taking phosphate rock 50 parts, 24.5 parts silica sand (Mole ratio CaO:SiO2=1:1), 13 parts low volatile coke and grounded separately as described above. The grounded mixture kneaded thoroughly, made a single aggregate and fed to the reactor. The phosphate ore analysed 33.68 percent P2O5, 45.90 percent CaO, 4.9 percent SiO2, 0.56 percent Al2O3 and 3.43 percent Fe2O3 all by weight; ground in ball mill (passing through 200 mesh). The coke used had low volatiles and was ground to −200 mesh size. The river silica sand was also ground to −200 mesh size and blended with rock phosphate carbon mixture. The blended mixture was aggregated in a vibrating granulator. The aggregate of 50 gms after Calcination at 800° C. for 2 hours was placed inside the alumina tube reactor of size 48 mm OD, 40 mm ID and 375 mm length. The alumina reactor is heated initially with electrical heating up to 1050° C. and then temperature raised & maintained at 1200-1250° C. by burning in oxygen for 4 hrs in presence of bedding coke. The gaseous product containing P2O5 was passed through a Fluidised Bed with a stream of Cl2. The greenish fuming liquid collected in the externally cooled glass lined pot. The product analysed contains PCl3 with some PCl5, POCl3 and P2O5 as impurities which can be separated by techniques known in the art.

The clinker residue collected at the end of reaction contained less than 2 percent P2O5 (1.90% P2O5 corresponding to greater than 96% removal of P2O5) in the cementatious Calcium silicate.

Example 5

The product off gas from first Reactor containing P2O5 and P4 and CO are reacted with chlorine at 3 mole/mole of P2O5, in a gas phase Reactor for producing Phosphorous chlorides, mainly PCl3, which is condensed from the other gases. In another embodiment the off gases are passed through a Fluidized Bed Reactor containing fine carbon bed along with chlorine. The FBR with carbon bed at 700° C. facilitate the chlorination process and maximize the yield with only stoichiometric chlorine consumption.

ADVANTAGES

1. The invented process balances endothermic and exothermic reactions with small additional quantity of coke and oxygen.
2. Thus, operational as well as capital costs are saved.
3. Unlike processes known in the prior art where the byproduct is mostly calcium silicate, the byproduct of the invented process is cement clinker only. Thereby higher value and full utilisation is achieved.
4. Unlike processes known in the prior art wherein the product flexibility is minimal, in the invented process variety of phosphorous derivatives can be produced.
5. Process integration and flexibility results into saving capital cost.

I claim:

1. A process for manufacturing phosphorous trichloride, phosphorous pentachloride and cement comprising:
   (i) heating at an elevated temperature of between 1100° C. to 1500° C. a pulverised mixture of phosphate ores containing calcium oxide, carbonaceous substances, silica and optionally alumina to produce gaseous products and cement, wherein the pulverised mixture has a ratio of calcium oxide to silica of 1.4 or above,
   (ii) treating the gaseous products with chlorine in a ratio of 1 to 5 moles of chlorine per mole of phosphorous oxide contained in the phosphate ores while maintaining the temperature between 400° C. to 1000° C. by cooling, and
   (iii) separating a gaseous mixture primarily including the phosphorous trichloride and the phosphorous pentachloride from the cement and thereafter
   (iv) separating the phosphorous trichloride and the phosphorous pentachloride.

2. The process claimed in claim 1, wherein the carbonaceous substances are any one or more of coke, semicoke, asphalt, wood charcoal, char or biomass.

3. The process claimed in claim 1, wherein the phosphate ores contain 2 to 45% of phosphorous oxide.

4. The process claimed in claim 1, wherein the gaseous products are treated with chlorine in the ratio of 3 moles of chlorine per mole of phosphorous oxide.

5. The process claimed in claim 1, wherein the pulverised mixture of phosphate ores, carbonaceous substances, silica and optionally alumina is heated to between 1200° C. to 1400° C.

6. The process claimed in claim 1, wherein the pulverised mixture of phosphate ores, carbonaceous substances, silica and optionally alumina further optionally includes iron oxide.

7. The process claim in claim 1, wherein while treating the gaseous products with chlorine, the temperature is maintained between 500° C. to 700° C.

* * * * *